United States Patent

Kohno et al.

[11] Patent Number: 5,203,835
[45] Date of Patent: Apr. 20, 1993

[54] LOCK-UP TORQUE CONVERTER FOR AUTOMATIC TRANSMISSION

[75] Inventors: Satoshi Kohno; Hirofumi Ara, both of Kanagawa, Japan

[73] Assignee: Atsugi Unisia Corporation, Japan

[21] Appl. No.: 888,650

[22] Filed: May 27, 1992

[30] Foreign Application Priority Data

May 29, 1991 [JP] Japan .................. 3-124161

[51] Int. Cl.⁵ .......................................... F16D 33/00
[52] U.S. Cl. .................. 192/3.29; 192/3.28; 192/106.2; 60/338; 464/68
[58] Field of Search .......... 192/3.29, 3.26, 3.28, 192/3.3, 3.31, 106.2; 60/338; 464/68

[56] References Cited

U.S. PATENT DOCUMENTS

| | | | |
|---|---|---|---|
| 2,913,925 | 11/1959 | Smirl | 60/338 X |
| 4,153,147 | 5/1979 | Chana | 192/3.29 X |
| 4,667,470 | 5/1987 | Billet et al. | 60/338 |
| 4,689,954 | 9/1987 | Billet | 60/338 |
| 4,697,417 | 10/1987 | Billet et al. | 60/338 |
| 4,884,216 | 7/1989 | Fukushima | 192/3.29 X |
| 4,928,486 | 5/1990 | Despres | 192/106.2 X |
| 5,062,517 | 11/1991 | Muchmore et al. | 192/3.29 X |
| 5,065,853 | 11/1991 | Fujmoto et al. | 192/3.29 |
| 5,070,974 | 12/1991 | Kirkwood | 192/3.3 |
| 5,086,892 | 2/1992 | Schierling | 192/3.29 |

FOREIGN PATENT DOCUMENTS 57-100653  6/1982  Japan .

Primary Examiner—Leslie A. Braun
Assistant Examiner—Andrea Pitts
Attorney, Agent, or Firm—Ronald P. Kananen

[57] ABSTRACT

A lock-up torque converter for an automatic transmission includes a pump fixedly connected to a crankshaft of the internal combustion engine and a converter cover connected to a converter output shaft during a lock-up condition. A shock absorbing member connects the pump and the converter cover to be elastic in the rotating direction of the converter output shaft. Accordingly, both fluctuations of the engine speed and of the output shaft speed are absorbed by the pump and the converter cover, respectively and therefore the torsional vibrations and the noises generated in the passenger compartment are largely suppressed.

6 Claims, 2 Drawing Sheets

LOCK-UP TORQUE CONVERTER FOR AUTOMATIC TRANSMISSION

BACKGROUND OF THE INVENTION

1. Field of the Invention

The present invention relates to improvements in a lock-up torque converter for automatic transmissions in use for automotive vehicles.

2. Description of the Prior Art

In recent years, a torque converter with a lock-up mechanism has been proposed and put into practical use in order to further effectively transmit torque of an internal combustion engine to an automatic transmission in an automotive vehicle. A typical lock-up torque converter is disclosed, for example, in Japanese Utility Model Provisional Publication No. 57-100653. The lock-up torque converter includes a torsional damper through which a crankshaft of the engine is connected to a converter cover of the torque converter for absorbing the impact force due to the fluctuation of the engine torque.

However, with such a lock-up torque converter, since only the torsional damper is directly connected to the crankshaft during a lock-up condition, the inertial mass which should be directly applied to the crankshaft becomes short. Accordingly, the fluctuation of the engine speed is not sufficiently absorbed and increases a torsional vibration of the crankshaft and the noise in a passenger compartment.

SUMMARY OF THE INVENTION

It is an object of the present invention to provide an improved torque converter which properly distributes the inertial mass of the torque converter to an engine and an automatic transmission during the lock-up condition.

A lock-up torque converter for an automatic transmission according to the present invention transmits torque generated by an internal combustion engine to a converter output shaft through which the engine torque is transmitted to an automatic transmission. The lock-up torque converter comprises a first member which is fixedly connected to a crankshaft of the internal combustion engine. The first member includes a pump. A second member is sealingly contacted with the first housing, and connected to the converter output shaft during a lock-up condition. A shock absorbing member elastically operatively connects the first and second members for rotation.

With this arrangement, both fluctuations of the engine speed and of the output shaft speed are absorbed by the lock-up torque converter and therefore the torsional vibrations and the noises generated in the passenger compartment are largely suppressed.

DETAILED DESCRIPTION OF THE INVENTION

Figure 1:
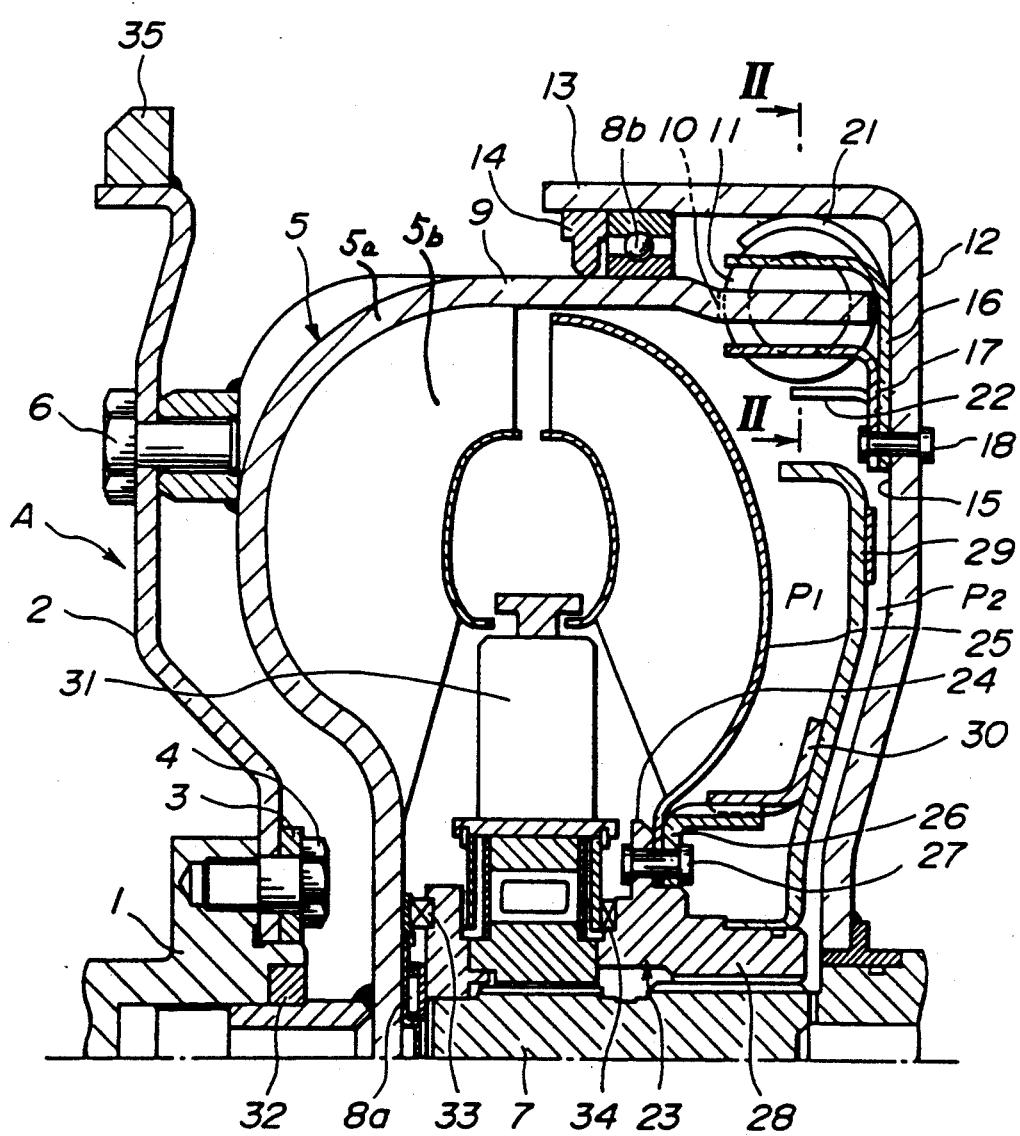
FIG. 1 is a cross-sectional view of an embodiment of a lock-up torque converter according to the present invention.
Figure 2:
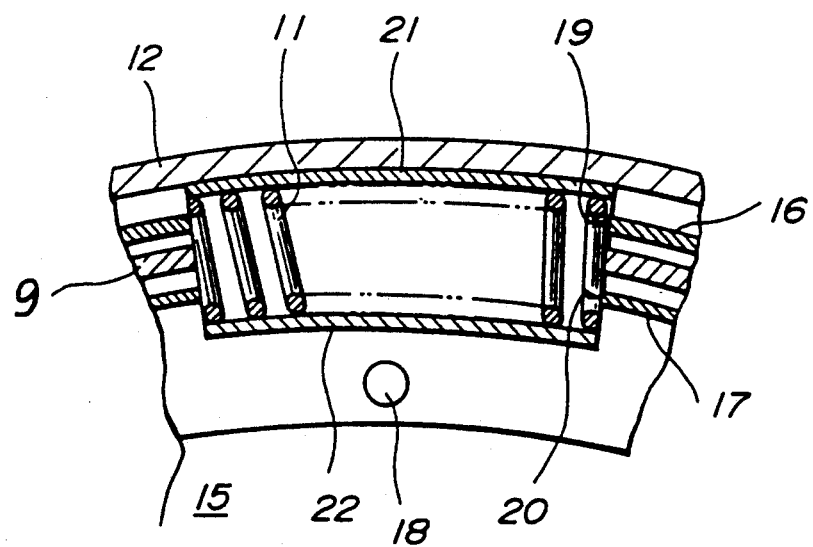
FIG. 2 is a cross-sectional view of FIG. 1 taken in the direction of the arrows substantially along the line II—II of FIG. 1.

Referring now to FIGS. 1 and 2, there is shown an embodiment of a lock-up torque converter A for an automatic transmission, according to the present invention. The lock-up torque converter A is connected to a crankshaft 1 of an internal combustion engine (not shown) of an automotive vehicle. A plurality of components of the lock-up torque converter A are arranged in coaxial fashion with regard to the crankshaft 1. The end portion of the crankshaft 1 is fixedly connected to a drive plate 2 of a generally plate shape through a reinforcing member 3 with bolts 4. The drive plate 2 is fixedly connected at its outer portion to a pump 5 with bolts 6. The pump 5 is constituted by a pump shell 5a and a plurality of blades 5b. The pump shell 5a includes a cylindrical portion 9 extending rearward. The inner peripheral portion of the pump shell 5a is rotatably supported to the end of an output shaft 7 through a bearing 8a. The end portion of the cylindrical portion 9 is cut-out to form a plurality of spring receiving portions 10. A plurality of springs 11 are disposed in the spring receiving portions 10, respectively. A ring gear 35 is fixed to the outer peripheral end of the drive plate 2. The ring gear 35 is engaged with a pinion gear of a starter motor (although not shown) when an ignition key is turned on for starting the engine.

A converter cover 12 is formed in a cylindrical shape having a closed end and an open end, and is rotatably supported at its cylindrical portion 13 to the cylindrical portion 9 of the pump 5 through a bearing 8b. A sealing member 14 is disposed in the clearance between the cylindrical portion 13 and the cylindrical portion 9 of the pump 5 so as to seal operation oil within the torque converter A. The inner peripheral end of the closed end of the converter cover 12 is rotatably connected to the output shaft 7.

First and second sub-plates 16 and 17 are secured to the inner wall 15 of the converter cover 12 with rivets 18. These sub-plates 16 and 17 include a plurality of spring receiving portions 19 and 20 where the springs 11 are disposed to elastically (or operably) connect the pump 5 and the converter cover 12 in the rotating direction of the pump 5 and the converter cover 12. Furthermore, the sub-plates 16 and 17 include spring supporting portions 21 and 22 which support the springs 11 at the spring receiving portions 19 and 20, respectively. Accordingly, the springs 11 are arranged to connect the pump 5 and the converter cover 12 so as to keep an elastic connection between the pump 5 and the converter cover 12 in the rotating direction of the torque converter A.

A turbine hub 23 is splined to the output shaft 7. A turbine runner 25 and a piston guide 26 are fixed to a flange portion 24 of the turbine hub 23 with rivets 27. A piston 29 is engaged with a boss portion 28 of the turbine hub 23 so as to be slidable in the axial direction of the output shaft 7. A cylindrical arm portion 30 is fixedly connected to the piston 29 and slidably splined to the piston guide 26 so as to be slidable in the axial direction of the output shaft 7. Accordingly, in the case where that the automotive vehicle is driven at a predetermined speed or more, when a hydraulic pressure $P_1$ at a first side (a turbine runner side) of the piston 29 becomes higher than a hydraulic pressure $P_2$ of a second side (a converter cover side) of the piston 29, the piston 29 is slid to be connected to the inner wall 15 of the converter cover 12. A stator 31 is provided between the pump 5 and the turbine runner 25 to form a torque converter. The stator 31 is mounted to the output shaft 7 via a one way clutch (no numeral). Sealing members 32, 33 and 34 are disposed between the crankshaft and a shaft (no numeral) secured to inner peripheral portion of the pump 5, between the bearing 8a and a stator supporting member (no numeral), and between the stator 31 and the turbine hub 23, respectively.

In this arrangement, when the running speed of the automotive vehicle is lower than a predetermined speed, a torque transmitted from the crankshaft 1 to pump 5 through a drive plate 2 is transmitted to the turbine hub 23 and the output shaft 7 through a fluid coupling constituted by the pump 5, the stator 31 and the turbine runner 25.

When the running speed of the automotive vehicle is higher than or equal to the predetermined speed, the hydraulic pressure values of the first and second sides of the piston 29 are set such that the hydraulic pressure $P_1$ of the first side of the piston 29 is greater than the hydraulic pressure $P_2$ of the front side of the piston 29. Due to this pressure difference between the first and second sides, the piston 29 is slid to be connected to the converter cover 12. That is, the lock-up torque converter A is set in a lock-up condition. As a result of this connection, the converter cover 12 is integrally rotated with the pump 5 while the springs 11 are kept at a compressed condition. Accordingly, the engine torque is smoothly transmitted to the output shaft 7 through the pump 5, the springs 11, the converter cover 12, the piston 29 and the turbine hub 23. During this torque transmitting operation, the drive plate 2 and the pump 5 are fixed to the crankshaft 1, and act as a fly-wheel to absorb the fluctuation of the engine speed. Furthermore, the converter cover 12, the piston 29, the turbine 25 and the turbine hub 23 act as a fly-wheel to absorb the fluctuation of the output shaft speed.

With this arrangement, during the lock-up condition, the inertial mass of the lock-up torque converter A is properly distributed to the crankshaft 1 and the output shaft 7. Accordingly, the lock-up torque converter A absorbs the torsional vibrations and the noise in the passenger compartment.

What is claimed is:

1. A lock-up torque converter for an automatic transmission, which transmits torque generated by an internal combustion engine to a converter output shaft through which the engine torque is transmitted to an automatic transmission, said lock-up torque converter comprising:
    a first member fixedly connected to a crankshaft of the internal combustion engine, said first member including a pump;
    a second member sealingly contacted with said first member, said second member being connected to the converter output shaft during a lock-up condition; and
    a shock absorbing member elastically operatively connecting said first and second members for rotation.

2. A lock-up torque converter as claimed in claim 1, wherein said first and second members defines a space around the converter output shaft.

3. A lock-up torque converter as claimed in claim 1, wherein said first member is fixed to the crankshaft through a drive plate, and said second member includes a converter cover.

4. A lock-up torque converter as claimed in claim 1, wherein the lock-up condition is carried out in a manner that a lock-up piston splined to the converter output shaft is connected to said second member.

5. A lock-up torque converter as claimed in claim 1, wherein said shock absorbing member includes a spring and is supported by a receiving member secured to said second member.

6. A lock-up torque converter as claimed in claim 2, wherein a stator and a turbine runner are disposed in the space around the converter output shaft.

* * * * *